(12) United States Patent
Yasuno

(10) Patent No.: US 12,444,987 B2
(45) Date of Patent: Oct. 14, 2025

(54) WIRELESS POWER TRANSMISSION APPARATUS

(71) Applicant: CANON KABUSHIKI KAISHA, Tokyo (JP)

(72) Inventor: Takashi Yasuno, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/815,672

(22) Filed: Aug. 26, 2024

(65) Prior Publication Data

US 2025/0079906 A1    Mar. 6, 2025

(30) Foreign Application Priority Data

Aug. 30, 2023  (JP) ................................. 2023-140231

(51) Int. Cl.
*H02J 50/40* (2016.01)
*H02J 50/10* (2016.01)
*H01F 38/14* (2006.01)

(52) U.S. Cl.
CPC ............ *H02J 50/402* (2020.01); *H02J 50/10* (2016.02); *H01F 38/14* (2013.01)

(58) Field of Classification Search
CPC .......... H02J 50/402; H02J 50/10; H01F 38/14
USPC ....................................................... 307/104
See application file for complete search history.

(56) References Cited

U.S. PATENT DOCUMENTS

| | | | |
|---|---|---|---|
| 9,859,052 B2* | 1/2018 | Kurz | H01F 27/2852 |
| 10,326,309 B2* | 6/2019 | Lee | H04B 5/79 |
| 2016/0218534 A1* | 7/2016 | Islinger | H01F 38/14 |
| 2017/0278619 A1* | 9/2017 | Lee | H01F 5/00 |
| 2020/0098510 A1* | 3/2020 | Unno | H01F 38/14 |
| 2020/0279686 A1* | 9/2020 | Pei | H02J 50/70 |
| 2021/0320527 A1* | 10/2021 | Lee | H02J 50/402 |

FOREIGN PATENT DOCUMENTS

JP    2016220268 A    12/2016

* cited by examiner

*Primary Examiner* — Alfonso Perez Borroto
(74) *Attorney, Agent, or Firm* — Canon U.S.A., Inc. IP Division

(57) ABSTRACT

A wireless power transmission apparatus includes a first power transmission coil configured to transmit power to a power reception coil, and including a portion with a first conductor width and a portion with a second conductor width, and a second power transmission coil configured to transmit power to the power reception coil, and including a portion with a third conductor width and a portion with a fourth conductor width. The first and second power transmission coils are adjacent at the portion with the second conductor width and the portion with the fourth conductor width with a predetermined separation distance. A sum of the second conductor width and the fourth conductor width is smaller than a sum of the first conductor width and the third conductor width. The predetermined separation distance is smaller than or equal to a smaller one of the second conductor width and the fourth conductor width.

13 Claims, 8 Drawing Sheets

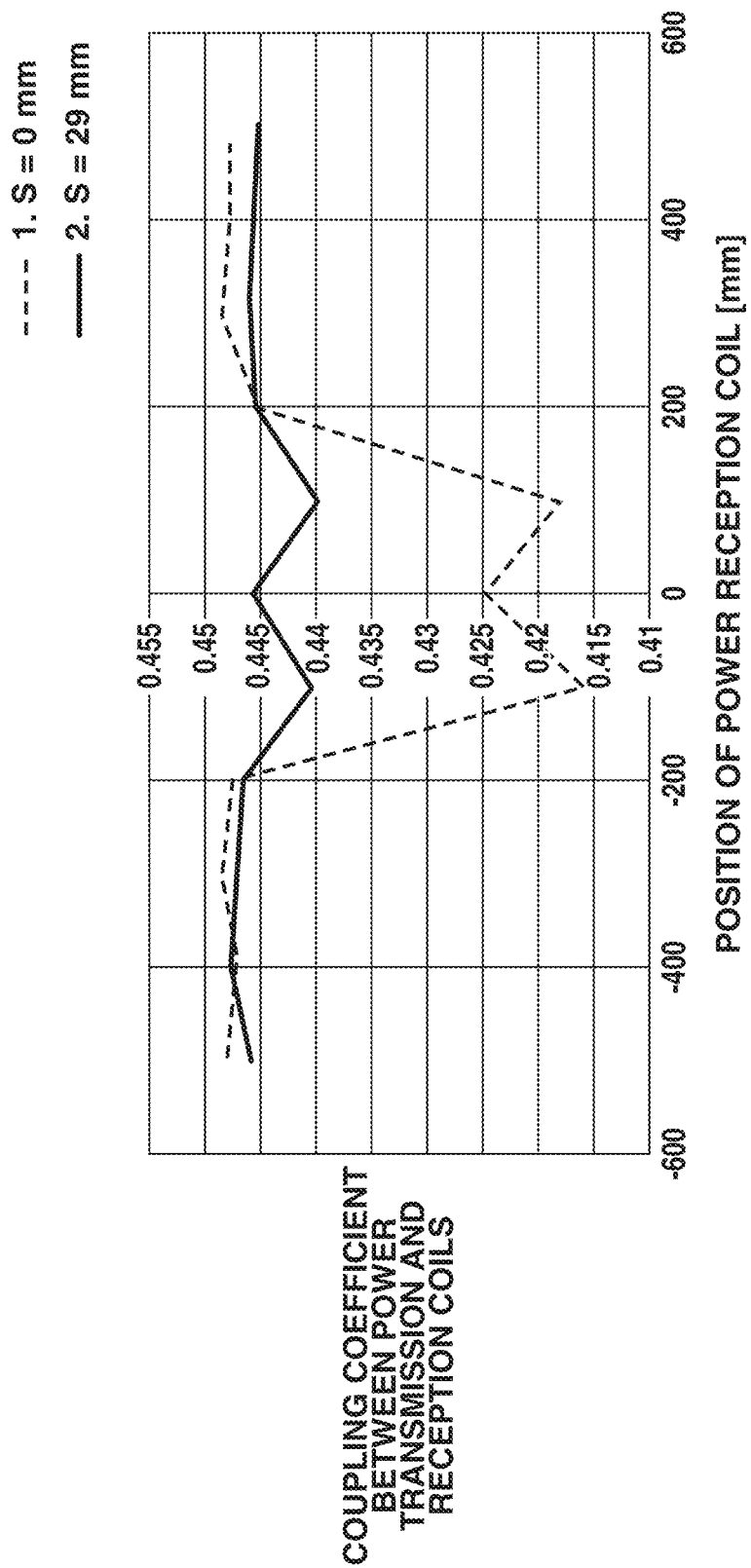

WIRELESS POWER TRANSMISSION APPARATUS

BACKGROUND

Field

The present disclosure relates to a wireless power transmission apparatus.

Description of the Related Art

Wireless power feeding has become widespread as power feed means for feeding electric power to movable objects, such as electric vehicles and unmanned transportation vehicles in a factory. In this case, a power reception coil mounted on the movable object moves parallel to and in close proximity to a power transmission coil installed along a moving route of the movable object, so that the power is wirelessly fed from the power transmission coil. Meanwhile, the power transmission coil is easy to be installed and manufactured, so that the power transmission coil may sometimes be divided into a plurality of power transmission coils. In this case, the greater a separation distance between two adjacent power transmission coils is, the lower a coupling coefficient (coupling coefficient between power transmission and reception coils) between the power transmission coil and the power reception coil becomes. The lowering of the coupling coefficient leads to lowing the receiving power of the movable object, and the movable object may possibly be unable to operate normally. In consideration of this point, Japanese Patent Application Laid-open No. 2016-220268 discusses a configuration in which two adjacent power feed coils (power transmission coils) are provided with end portions of the power feed coils in a moving direction of the movable object arranged in a vertically overlapped manner.

SUMMARY

According to one embodiment of the present disclosure, a wireless power transmission apparatus includes a first power transmission coil configured to transmit power to a power reception coil, and including a portion with a first conductor width and a portion with a second conductor width, and a second power transmission coil configured to transmit power to the power reception coil, and including a portion with a third conductor width and a portion with a fourth conductor width, wherein the first power transmission coil and the second power transmission coil are adjacent to each other at the portion with the second conductor width and the portion with the fourth conductor width with a predetermined separation distance, wherein a sum of the second conductor width and the fourth conductor width is smaller than a sum of the first conductor width and the third conductor width, and wherein the predetermined separation distance is smaller than or equal to a smaller one of the second conductor width and the fourth conductor width.

According to another embodiment of the present disclosure, a wireless power transmission apparatus includes a first power transmission coil configured to transmit power to a power reception coil, and including a portion with a first conductor width and a portion with a second conductor width, and a second power transmission coil configured to transmit power to the power reception coil, and including a portion with a third conductor width and a portion with a fourth conductor width, wherein the first power transmission coil and the second power transmission coil are adjacent to each other at the portion with the second conductor width and the portion with the fourth conductor width to have a predetermined overlapped section, and wherein a difference between the predetermined overlapping section and a sum of the second conductor width and the fourth conductor width is smaller than a sum of the first conductor width and the third conductor width.

Further features of the present disclosure will become apparent from the following description of exemplary embodiments with reference to the attached drawings.

BRIEF DESCRIPTION OF THE DRAWINGS

FIG. 8 is a characteristic graph illustrating a coupling coefficient between power transmission coil and power reception coils with respect to positions of a power reception coil, according to the second exemplary embodiment of the present disclosure.

DESCRIPTION OF THE EMBODIMENTS

Hereinbelow, exemplary embodiments of the present disclosure will be described with reference to the accompanying drawings.

Initially, a first exemplary embodiment will be described.

Figure 1:
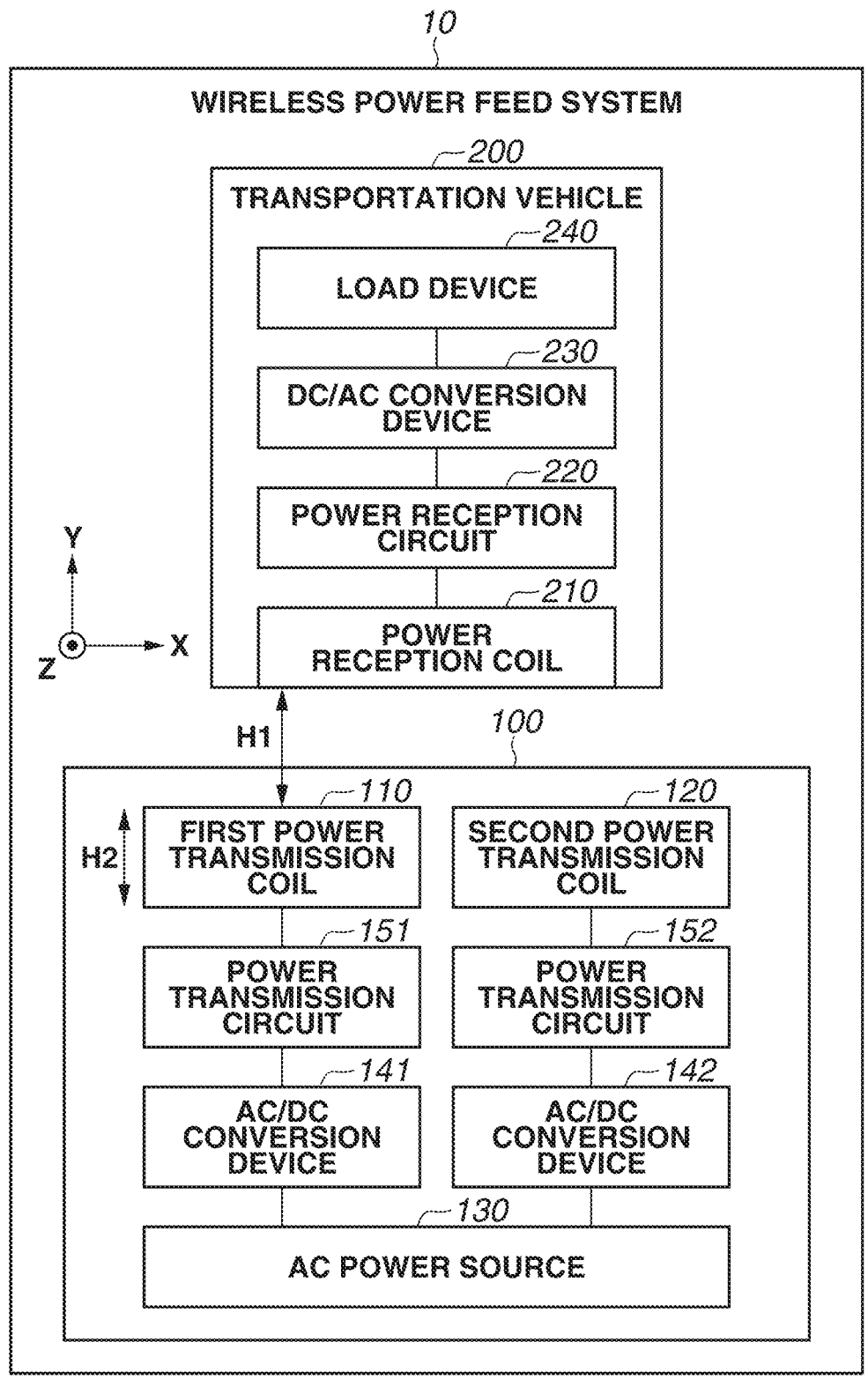
FIG. 1 is a block diagram schematically illustrating an example of a configuration of a wireless power feed system according to a first exemplary embodiment of the present disclosure.

FIG. 1 is a block diagram schematically illustrating an example of a configuration of a wireless power feed system 10 according to the first exemplary embodiment of the present disclosure. As illustrated in FIG. 1, the wireless power feed system 10 includes a wireless power transmission apparatus 100 and a transportation vehicle 200 serving as a wireless power reception apparatus. FIG. 1 includes an XYZ coordinate system with an X direction that is parallel to the drawing plane, a Y direction that is vertical to the drawing plane, and a Z direction that is perpendicularly into the drawing plane. The X, Y and Z axes are orthogonal to each other.

As illustrated in FIG. 1, the wireless power transmission apparatus 100 includes a first power transmission coil 110, a second power transmission coil 120, an alternating-current (AC) power source 130, an AC/direct-current (DC) conversion device 141, an AC/DC conversion device 142, a power transmission circuit 151, and a power transmission circuit 152.

The first power transmission coil 110 and the second power transmission coil 120 are power transmission coils for transmitting power to a power reception coil 210 mounted on the transportation vehicle 200, and are two adjacent power transmission coils.

The AC power source 130 corresponds to a commercial power source, and in Japan, the AC power source 130 outputs an AC voltage with a voltage of 100 V or 200 V and a frequency of 50 Hz or 60 Hz.

Each of the AC/DC conversion devices 141 and 142 receives the AC voltage from the AC power source 130 as an input and converts the AC voltage into a DC voltage.

The power transmission circuits 151 and 152 respectively receive DC voltages as inputs from the AC/DC conversion devices 141 and 142 to output AC voltages with a given frequency.

Each of the first power transmission coil 110 and the second power transmission coil 120 has a configuration, for example, obtained by winding a conductive member, and when an AC voltage is applied to both ends of each of the first power transmission coil 110 and the second power transmission coil 120 respectively from the power transmission circuits 151 and 152, a magnetic flux is generated around each of the conductive members described above.

The transportation vehicle 200 serving as a wireless power reception apparatus is, for example, a movable object movable in the X direction relative to the wireless power transmission apparatus 100. As illustrated in FIG. 1, the transportation vehicle 200 includes the power reception coil 210, a power reception circuit 220, a DC/AC conversion device 230, and a load device 240.

The power reception coil 210 is a coil for receiving power from the first power transmission coil 110 and/or the second power transmission coil 120. More specifically, the power reception coil 210 has a configuration, for example, obtained by winding a conductive member, and generates an AC voltage between both ends of the power reception coil 210 through an electromagnetic induction caused by the magnetic flux generated by the first power transmission coil 110 or the second power transmission coil 120.

The power reception circuit 220 receives an AC voltage with a given frequency from the power reception coil 210 as an input and outputs a DC voltage.

The DC/AC conversion device 230 receives a DC voltage from the power reception circuit 220 as an input and outputs an AC voltage corresponding to the commercial power source.

The load device 240 receives the AC voltage corresponding to the commercial power source from the DC/AC conversion device 230 as an input and executes a function that the load device 240 has.

The transportation vehicle 200 has a platform with the power reception coil 210, the power reception circuit 220, the DC/AC conversion device 230, and the load device 240 mounted thereon, and wheels are connected to the platform to move on a floor. In the present exemplary embodiment, the power reception coil 210 mounted on the transportation vehicle 200 moves parallel to and in close proximity to the power transmission coils 110 and 120 installed along the moving route of the transportation vehicle 200 (X direction in the example in FIG. 1) with the power reception coil 210 the power transmission coils 110 and 120, so that power is wirelessly fed to the power reception coil 210.

In FIG. 1, the separation distance between the power transmission coils 110 and 120 and the power reception coil 210 (i.e., between power transmission coils and the power reception coils) in a power feed direction (Y direction) is defined as H1, and the height which is the length of each of the power transmission coils 110 and 120 in the Y direction is defined as H2. In this case, the power feed direction between the power transmission coils and the power reception coils does not necessarily need to be the direction relative to the floor. The present exemplary embodiment provides, even with the heights H2 of the power transmission coils 110 and 120 larger than the separation distance H1 between the power transmission coils and the power reception coils in the power feed direction (Y direction), the wireless power transmission apparatus 100 capable of preventing a decrease in a coupling coefficient between the power transmission coils and the power reception coils. In the present exemplary embodiment, the power transmission apparatus 100 may include two sets or more (more specifically, three sets or more) of the power transmission coils (110 and 120), the power transmission circuits (151 and 152), and the AC/DC conversion devices (141 and 142).

In the present exemplary embodiment, a current (AC current) flowing through the first power transmission coil 110 and a current (AC current) flowing through the second power transmission coil 120 may desirably have a same phase. This is to avoid a decrease in a transmission efficiency due to a phase shift between the AC current flowing through the first power transmission coil 110 and the AC current flowing through the second power transmission coil 120.

Figure 2:
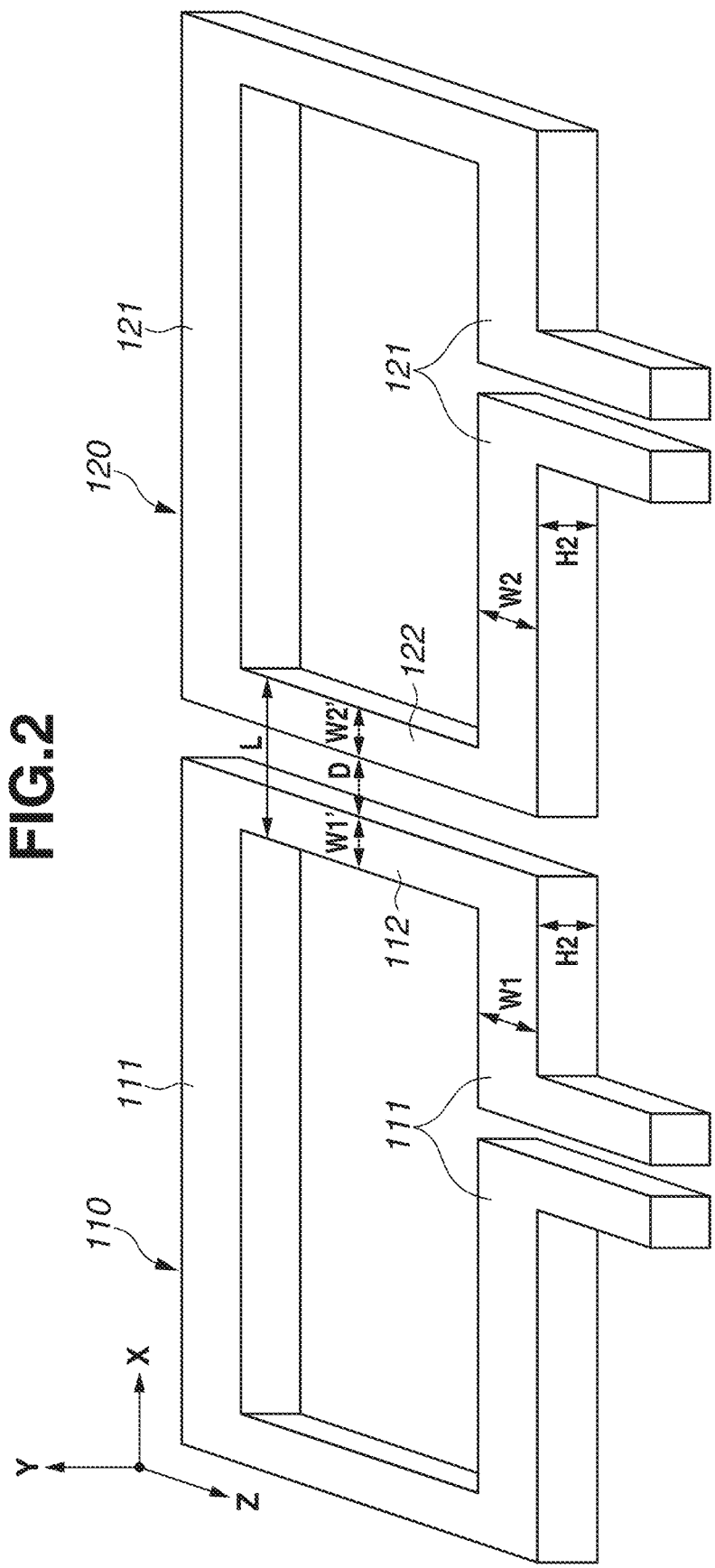
FIG. 2 is a diagram schematically illustrating a first example of a configuration including a first power transmission coil and a second power transmission coil that are two adjacent power transmission coils illustrated in FIG. 1, according to the first exemplary embodiment of the present disclosure.

FIG. 2 is a diagram schematically illustrating a first example of a configuration including the first power transmission coil 110 and the second power transmission coil 120 that are the two adjacent power transmission coils illustrated in FIG. 1, according to the first exemplary embodiment of the present disclosure. In FIG. 2, components similar to those illustrated in FIG. 1 are assigned the same reference numbers or symbols, and detailed descriptions thereof are omitted. In FIG. 2, an XYZ coordinate system corresponding to the XYZ coordinate system illustrated in FIG. 1 is illustrated.

As illustrated in FIG. 2, the first power transmission coil 110 has portions 111 with a first conductor width W1 in a conductor body arranged in the moving direction (X direction) of the transportation vehicle 200 illustrated in FIG. 1. In the first power transmission coil 110 illustrated in FIG. 2, it is desirable that the portions 111 with the first conductor width W1 of the conductor body arranged in the moving direction (X direction) of the transportation vehicle 200 illustrated in FIG. 1 occupy half or more of the entire conductor body (more desirably, 80% or more), in consideration of manufacturing errors or the like. Further, as illustrated in FIG. 2, the first power transmission coil 110 has a portion 112 with a second conductor width W1' in the conductor body arranged in a direction (Z direction)

orthogonal to the moving direction (X direction) of the transportation vehicle 200 illustrated in FIG. 1. As illustrated in FIG. 2, the height H2 of the first power transmission coil 110 corresponds to the length in a direction intersecting with (more specifically, orthogonal to, in the present exemplary embodiment) the first conductor width W1 in the portions 111 with the first conductor width W1.

As illustrated in FIG. 2, the second power transmission coil 120 has portions 121 with a third conductor width W2 in a conductor body arranged in the moving direction (X direction) of the transportation vehicle 200 illustrated in FIG. 1. In the second power transmission coil 120 illustrated in FIG. 2, it is desirable that the portions 121 with the third conductor width W2 of the conductor body arranged in the moving direction (X direction) of the transportation vehicle 200 illustrated in FIG. 1 occupy half or more of the entire conductor body (more desirably, 80% or more), in consideration of manufacturing errors or the like. Further, as illustrated in FIG. 2, the second power transmission coil 120 has a portion 122 with a fourth conductor width W2' in the conductor body arranged in the direction (Z direction) orthogonal to the moving direction (X direction) of the transportation vehicle 200 illustrated in FIG. 1. As illustrated in FIG. 2, the height H2 of the second power transmission coil 120 corresponds to the length in a direction intersecting with (more specifically, orthogonal to, in the present exemplary embodiment) the third conductor width W2 in the portions 121 with the third conductor width W2.

FIG. 2 illustrates a state where the portion 112 with the second conductor width W1' in the first power transmission coil 110, and the portion 122 with the fourth conductor width W2' in the second power transmission coil 120 are arranged adjacent at a predetermined separation distance D apart. In this case, the predetermined separation distance D is a separation distance in the moving direction (X direction) of the transportation vehicle 200 serving as the movable object provided with the power reception coil 210 illustrated in FIG. 1. In consideration of manufacturing errors or the like, the predetermined separation distance D may desirably be an average distance between the portion 112 with the second conductor width W1' in the first power transmission coil 110, and the portion 122 with the fourth conductor width W2' in the second power transmission coil 120.

In FIG. 2, in the adjacent area between the portion 112 with the second conductor width W1' in the first power transmission coil 110, and the portion 122 with the fourth conductor width W2' in the second power transmission coil 120, a distance L including the conductor bodies in the moving direction (X direction) of the transportation vehicle 200 are as follows. The distance L is the sum of the second conductor width W1', the fourth conductor width W2', and the predetermined separation distance D, as illustrated in FIG. 2.

In the wireless power transmission apparatus 100 according to the present exemplary embodiment, the second conductor width W1' and the fourth conductor width W2' is made smaller than the first conductor width W1 and the third conductor width W2, so that the distance L is reduced, thus preventing a decrease in the coupling coefficient between the power transmission coils and the power reception coils. More specifically, in the present exemplary embodiment, the sum of the second conductor width W1' and the fourth conductor width W2' is set smaller than the sum of the first conductor width W1 and the third conductor width W2. Further, in the present exemplary embodiment, the predetermined separation distance D is set smaller than or equal to a conductor width of smaller one of the second conductor width W1' and the fourth conductor width W2'. With this configuration according to the present exemplary embodiment, it is possible to prevent a decrease in the coupling coefficient between the power transmission coils and the power reception coils.

Figure 3:
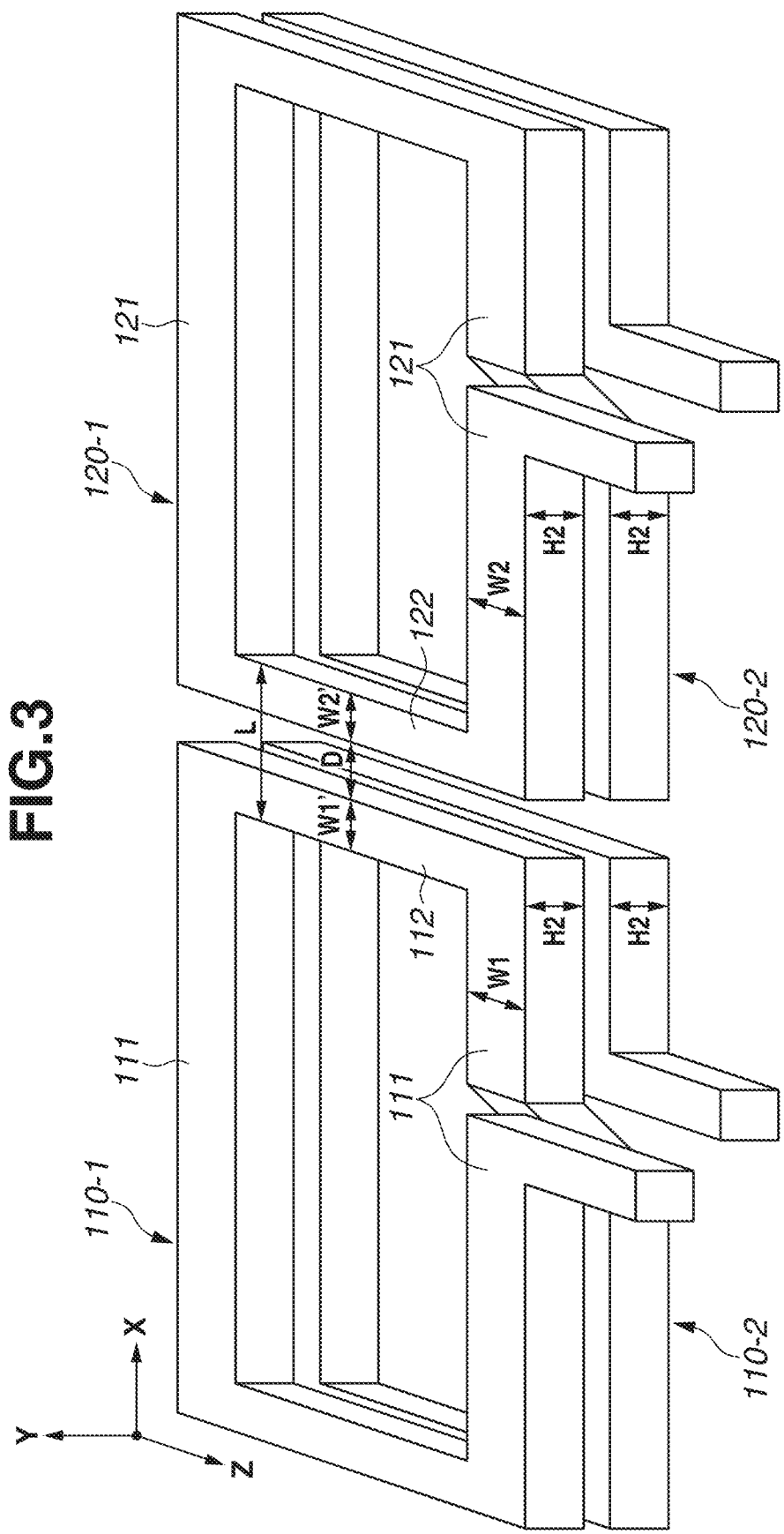
FIG. 3 is a diagram schematically illustrating a second example of a configuration including the first power transmission coil and the second power transmission coil that are the two adjacent power transmission coils illustrated in FIG. 1, according to the first exemplary embodiment of the present disclosure.

FIG. 3 is a diagram schematically illustrating a second example of a configuration including the first power transmission coil 110 and the second power transmission coil 120 that are the two adjacent power transmission coils illustrated in FIG. 1, according to the first exemplary embodiment of the present disclosure. In FIG. 3, components similar to those illustrated in FIGS. 1 and 2 are assigned the same numerals or symbols, and detailed descriptions thereof are omitted. In FIG. 3, an XYZ coordinate system corresponding to the XYZ coordinate system illustrated in FIGS. 1 and 2 is illustrated.

More specifically, in the second example illustrated in FIG. 3, the number of turns of each of the first power transmission coil 110 and the second power transmission coil 120 is increased as compared with the first example illustrated in FIG. 2. More specifically, the first example illustrated in FIG. 2 includes the first power transmission coil 110 with the number of turns in the coil being one, and the second power transmission coil 120 with the number of turns in the coil being one. In contrast to this, the second example illustrated in FIG. 3 has first power transmission coils 110-1 and 110-2 with the number of turns in the coils being two, and second power transmission coils 120-1 and 120-2 with the number of turns in the coils being two. Thus, in the present exemplary embodiment, the number of turns in each of the first power transmission coil 110 and the second power transmission coil 120 is not limited to one, and may be two or more.

Figure 4:
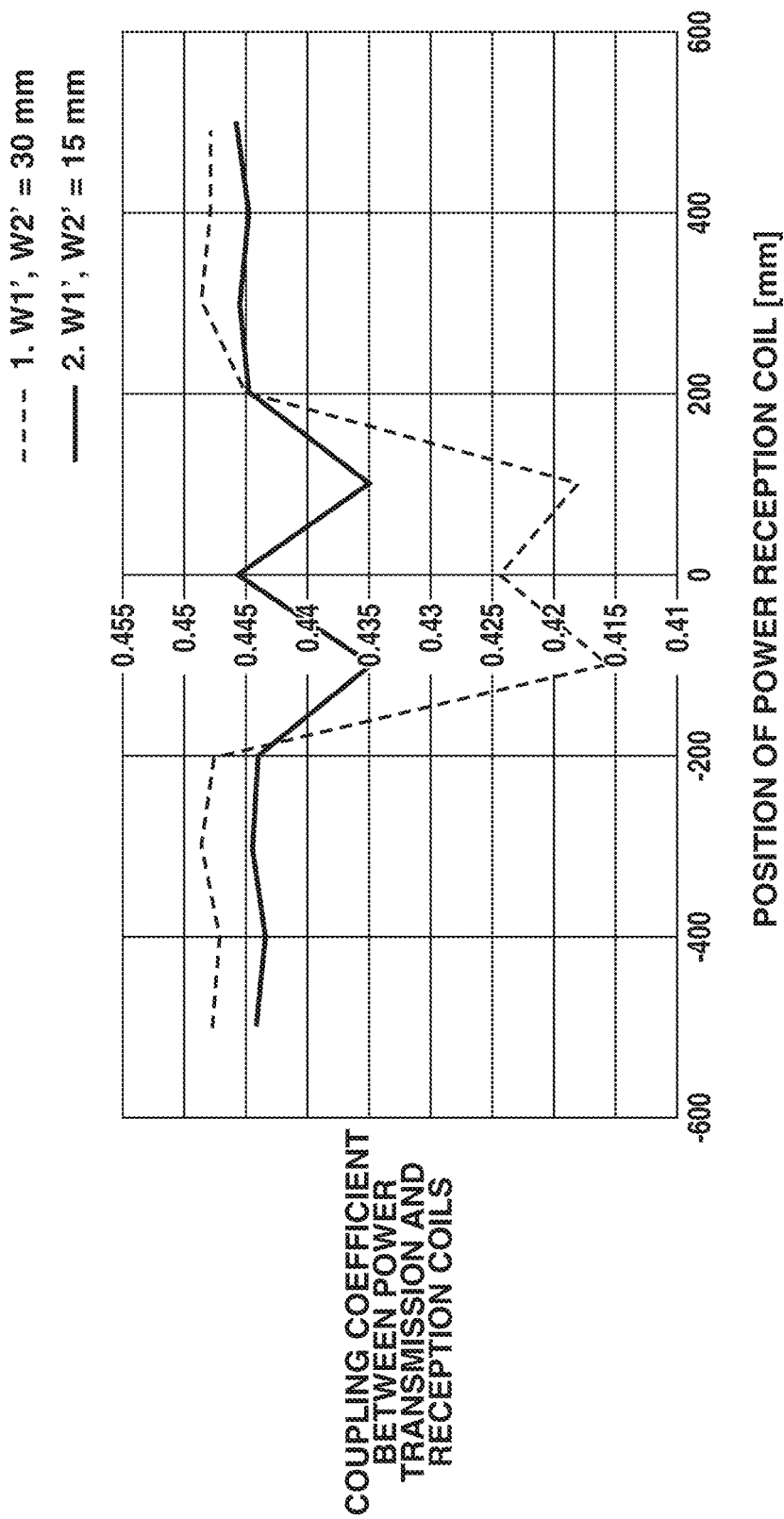
FIG. 4 is a characteristic graph illustrating a coupling coefficient between power transmission coils and power reception coils with respect to positions of a power reception coil, according to the first exemplary embodiment of the present disclosure.

FIG. 4 is a characteristic graph illustrating a coupling coefficient between the power transmission coils and the power reception coils for positions of the power reception coil 210, according to the first exemplary embodiment of the present disclosure. In FIG. 4, the horizontal axis indicates positions of the power reception coil 210, and the left side positions facing the first power transmission coil 110 are defined as negative positions, and the right side positions facing the second power transmission coil 120 are defined as positive positions, with the center position of the predetermined separation distance D illustrated in FIG. 2 being 0 mm. In FIG. 4, the vertical axis indicates coupling coefficients between the power transmission coils and the power reception coils. More specifically, each coupling coefficient indicates the sum of the coupling coefficient between the first power transmission coil 110 and the power reception coil 210 and the coupling coefficient between the second power transmission coil 120 and the power reception coil 210.

A data line 1 illustrated by a dotted line in FIG. 4 indicates characteristics in a case where each of the second conductor width W1' and the fourth conductor width W2' is 30 mm, when each of the first conductor width W1 and the third conductor width W2 illustrated in FIG. 2 is 30 mm and the predetermined separation distance D illustrated in FIG. 2 is 1 mm. A data line 2 illustrated by a solid line in FIG. 4 indicates characteristics in a case where each of the second conductor width W1' and the fourth conductor width W2' is 15 mm, when each of the first conductor width W1 and the third conductor width W2 illustrated in FIG. 2 is 30 mm, and the predetermined separation distance D illustrated in FIG. 2 is 1 mm. In the characteristic graph illustrated in FIG. 4, the data line 1 indicates that the coupling coefficient between the power transmission coils and the power reception coils on the vertical axis decreases at a position at which the power reception coil 210 is located near 0 mm, relative to positions other than the position at which the power reception coil 210 is located near 0 mm on the horizontal axis, but the data line 2 indicates that the decrease is improved.

Table 1 below indicates a rate of decrease from a maximum value to a minimum value in a coupling coefficient between the power transmission coils and the power reception coils with respect to a position of the power reception coil 210.

TABLE 1

| Data Row Name | W1, W2 [mm] | W1', W2' [mm] | D [mm] | L [mm] | Rate of Decrease from Maximum Value to Minimum Value [%] |
|---|---|---|---|---|---|
| 1. W1', W2' = 30 mm D = 1 mm | 30 | 30 | 1 | 61 | 7.2% |
| 2. W1', W2' = 15 mm D = 1 mm | 30 | 15 | 1 | 31 | 2.4% |
| 3. W1', W2' = 15 mm D = 15 mm | 30 | 15 | 15 | 45 | 5.6% |
| 4. W1', W2' = 15 mm D = 20 mm | 30 | 15 | 20 | 50 | 8.8% |

A data row 1 in table 1 corresponds to the data line 1 illustrated in FIG. 4. A data row 2 in the table 1 corresponds to the data line 2 illustrated in FIG. 4. As illustrated in table 1, the calculated rate of decrease from the maximum value to the minimum value of the coupling coefficient between the power transmission coils and the power reception coils with respect to the position of the power reception coil 210 for the data line 1 illustrated in FIG. 4 is 7.2%. As illustrated in table 1, the calculated rate of decrease from the maximum value to the minimum value of the coupling coefficient between the power transmission coils and the power reception coils with respect to the position of the power reception coil 210 for the data line 2 illustrated in FIG. 4 is 2.4%. Further, a data row indicating data with the condition that the predetermined separation distance D is 1 mm in the data row 2 changed to a condition that the predetermined separation distance D is 15 mm is referred to as a data row 3. A data row indicating data obtained by changing the condition to a condition that the predetermined separation distance D is 20 mm is referred to as a data row 4. As illustrated in table 1, the calculated rate of decrease from the maximum value to the minimum value of the coupling coefficient between the power transmission coils and the power reception coils with respect to the position of the power reception coil 210 for the data row 3 is 5.6%. As illustrated in table 1, the calculated rate of decrease from the maximum value to the minimum value of the coupling coefficient between the power transmission coils and the power reception coils with respect to the position of the power reception coil 210 for the data row 4 is 8.8%.

From the results in table 1, it is found that the rate of decrease of the coupling coefficient between the power transmission coils and the power reception coils from the maximum value to the minimum value with respect to the position of the power reception coil 210 in each of the data rows 2 and 3 is smaller than the rate of decrease in the data row 1, and thus the decrease in the coupling coefficient between the power transmission coils and the power reception coils can be reduced. More specifically, in the data row 2, which is applicable to the present exemplary embodiment, the sum (30 mm) of the second conductor width W1' and the fourth conductor width W2' is smaller than the sum (60 mm) of the first conductor width W1 and the third conductor width W2. Further, in the data row 2, which is applicable to the present exemplary embodiment, the predetermined separation distance D (1 mm) is smaller than or equal to (15 mm or less) a conductor width of smaller one of the second conductor width W1' and the fourth conductor width W2'. In the data row 3, which is applicable to the present exemplary embodiment, the sum (30 mm) of the second conductor width W1' and the fourth conductor width W2' is smaller than the sum (60 mm) of the first conductor width W1 and the third conductor width W2. Further, in the data row 3, which is applicable to the present exemplary embodiment, the predetermined separation distance D (15 mm) is smaller than or equal to (15 mm or less) a conductor width of the smaller one of the second conductor width W1' and the fourth conductor width W2'.

From the results in table 1, even if the predetermined separation distance D is expanded to the extent of the width of the second conductor width W1' or the fourth conductor width W2', a decrease in the coupling coefficient between the power transmission coils and the power reception coils can be improved.

The examples illustrated in table 1 describe the characteristic results in which both the first conductor width W1 and the third conductor width W2 are 30 mm, but they are not limited to this conductor width. In the present exemplary embodiment, it is sufficient that the relationship that the second conductor width W1' and the fourth conductor width W2' are smaller than the first conductor width W1 and the third conductor width W2, and that the predetermined separation distance D is smaller than or equal to the conductor width of the smaller one of the second conductor width W1' and the fourth conductor width W2' is satisfied.

According to the first exemplary embodiment, the conductor widths W1' and W2' in the adjacent areas of the two power transmission coils are made small and the predetermined separation distance D is limited, so that a decrease in the coupling coefficient between the power transmission coils and the power reception coils is prevented when the power reception coil moves in parallel to and in close proximity to the adjacent area of the two power transmission coils. For example, according to the first exemplary embodiment, even in a case where the height H2 of the respective power transmission coils 110 and 120 is larger than the separation distance H1 between the power transmission coils and the power reception coils in the power feed direction (Y direction), it is possible to prevent a decrease in the coupling coefficient between the power transmission coils and the power reception coils.

Next, a second exemplary embodiment will be described. In the description of the second exemplary embodiment, the descriptions of items similar to those of the above-described first exemplary embodiment are omitted, and only items different from those of the first exemplary embodiment will be described.

The schematic configuration of the wireless power feed system according to the second exemplary embodiment is similar to that of the wireless power feed system 10 according to the first exemplary embodiment illustrated in FIG. 1.

Figure 5:
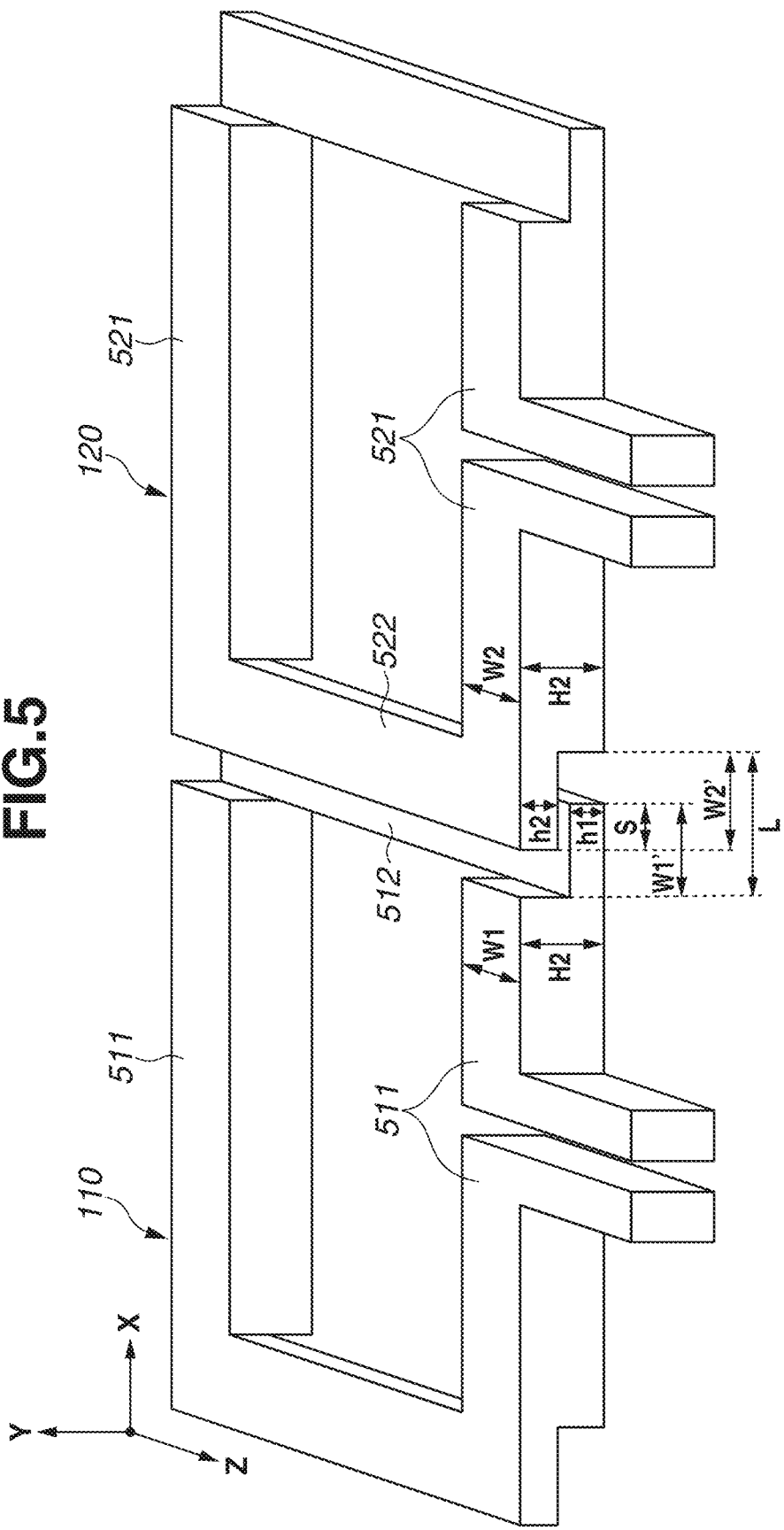
FIG. 5 is a diagram schematically illustrating a first example of a configuration including the first power transmission coil and the second power transmission coil that are the two adjacent power transmission coils illustrated in FIG. 1, according to a second exemplary embodiment of the present disclosure.

FIG. 5 is a diagram schematically illustrating a first example of a configuration including the first power transmission coil 110 and the second power transmission coil 120 that are the two adjacent power transmission coils illustrated in FIG. 1, according to the second exemplary embodiment of the present disclosure. In FIG. 5, components similar to those illustrated in FIGS. 1 to 3 are assigned the same reference numerals or symbols, and the detailed descriptions thereof are omitted. In FIG. 5, an XYZ coordinate system corresponding to the XYZ coordinate system illustrated in FIG. 1 is illustrated.

As illustrated in FIG. 5, the first power transmission coil 110 has portions 511 with the first conductor width W1 in the conductor body arranged in the moving direction (X direction) of the transportation vehicle 200 illustrated in FIG. 1. In the first power transmission coil 110 illustrated in FIG. 5, it is desirable that the portions 511 with the first conductor width W1 of the conductor body arranged in the moving direction (X direction) of the transportation vehicle 200 illustrated in FIG. 1 occupy half or more of the entire conductor body (more desirably, 80% or more), in consideration of manufacturing errors or the like. Further, as illustrated in FIG. 5, the first power transmission coil 110 has a portion 512 with the second conductor width W1' in the conductor body arranged in the direction (Z direction) orthogonal to the moving direction (X direction) of the transportation vehicle 200 illustrated in FIG. 1. As illustrated in FIG. 5, the height H2 of the first power transmission coil 110 corresponds to the length in the direction intersecting with (more specifically, orthogonal to, in the present exemplary embodiment) the first conductor width W1 in the portions 511 with the first conductor width W1.

As illustrated in FIG. 5, the second power transmission coil 120 has portions 521 with the third conductor width W2 in the conductor body arranged in the moving direction (X direction) of the transportation vehicle 200 illustrated in FIG. 1. In the second power transmission coil 120 illustrated in FIG. 5, it is desirable that the portions 521 with the third conductor width W2 of the conductor body arranged in the moving direction (X direction) of the transportation vehicle 200 illustrated in FIG. 1 occupy half or more of the entire conductor body (more desirably, 80% or more), in consideration of manufacturing errors or the like. Further, as illustrated in FIG. 5, the second power transmission coil 120 has a portion 522 with the fourth conductor width W2' in the conductor body arranged in the direction (Z direction) orthogonal to the moving direction (X direction) of the transportation vehicle 200 illustrated in FIG. 1. As illustrated in FIG. 5, the height H2 of the second power transmission coil 120 corresponds to the length in the direction intersecting with (more specifically, orthogonal to, in the present exemplary embodiment) the third conductor width W2 in the portions 521 with the third conductor width W2.

FIG. 5 illustrates a state where the portion 512 with the second conductor width W1' in the first power transmission coil 110, and the portion 522 with the fourth conductor width W2' in the second power transmission coil 120 are adjacently arranged to have a predetermined overlapping section S. In this case, the predetermined overlapping section S is an overlapping section in the moving direction (X direction) of the transportation vehicle 200, which is the movable object provided with the power reception coil 210 illustrated in FIG. 1.

In this case, in the present exemplary embodiment, the predetermined overlapping section S has a size larger than 0.

In FIG. 5, in the adjacent area of the portion 512 with the second conductor width W1' in the first power transmission coil 110, and the portion 522 with the fourth conductor width W2' in the second power transmission coil 120, the distance L in the moving direction (X direction) of the transportation vehicle 200 including the respective conductor bodies becomes as follows. The distance L is a difference between the predetermined overlapping section S and the sum of the second conductor width W1' and the fourth conductor width W2', as illustrated in FIG. 5.

In FIG. 5, the adjacent portions of the first power transmission coil 110 and the second power transmission coil 120 have protrusions and recessions to have the predetermined over lapping section S, thus reducing the distance L. This prevents a decrease in the coupling coefficient between the power transmission coils and the power reception coils. More specifically, in FIG. 5, the difference (i.e., distance L) between the predetermined overlapping section S and the sum of the second conductor width W1' and the fourth conductor width W2' is made smaller than the sum of the first conductor width W1 and the third conductor width W2 to prevent a decrease in the coupling coefficient between the power transmission coils and the power reception coils. The shape of each of the adjacent portions of the first power transmission coil 110 and the second power transmission coil 120 is not limited to the stepped shape illustrated in FIG. 5, and the predetermined overlapping section S may have a shape other than the stepped shape illustrated in FIG. 5.

In the example illustrated in FIG. 5, a height h1 of the portion 512 with the second conductor width W1' in the first power transmission coil 110 corresponds to the length in the direction intersecting with (more specifically, orthogonal to, in the present exemplary embodiment) the second conductor width W1'. In the example illustrated in FIG. 5, a height h2 of a portion 522 with the fourth conductor width W2' in the second power transmission coil 120 corresponds to the length in the direction intersecting with (more specifically, orthogonal to, in the present exemplary embodiment) the fourth conductor width W2'. In the example illustrated in FIG. 5, the sum of the height h1 of the portion 512 with the second conductor width W1' and the height h2 of the portion 522 with the fourth conductor width W2' is smaller than the height H2 of the portions 511 with the first conductor width W1 and the height H2 of the portions 521 with the third conductor width W2. Accordingly, in the example illustrated in FIG. 5, the first power transmission coil 110 and the second power transmission coil 120, which are two power transmission coils, are not in contact with each other.

Figure 6:
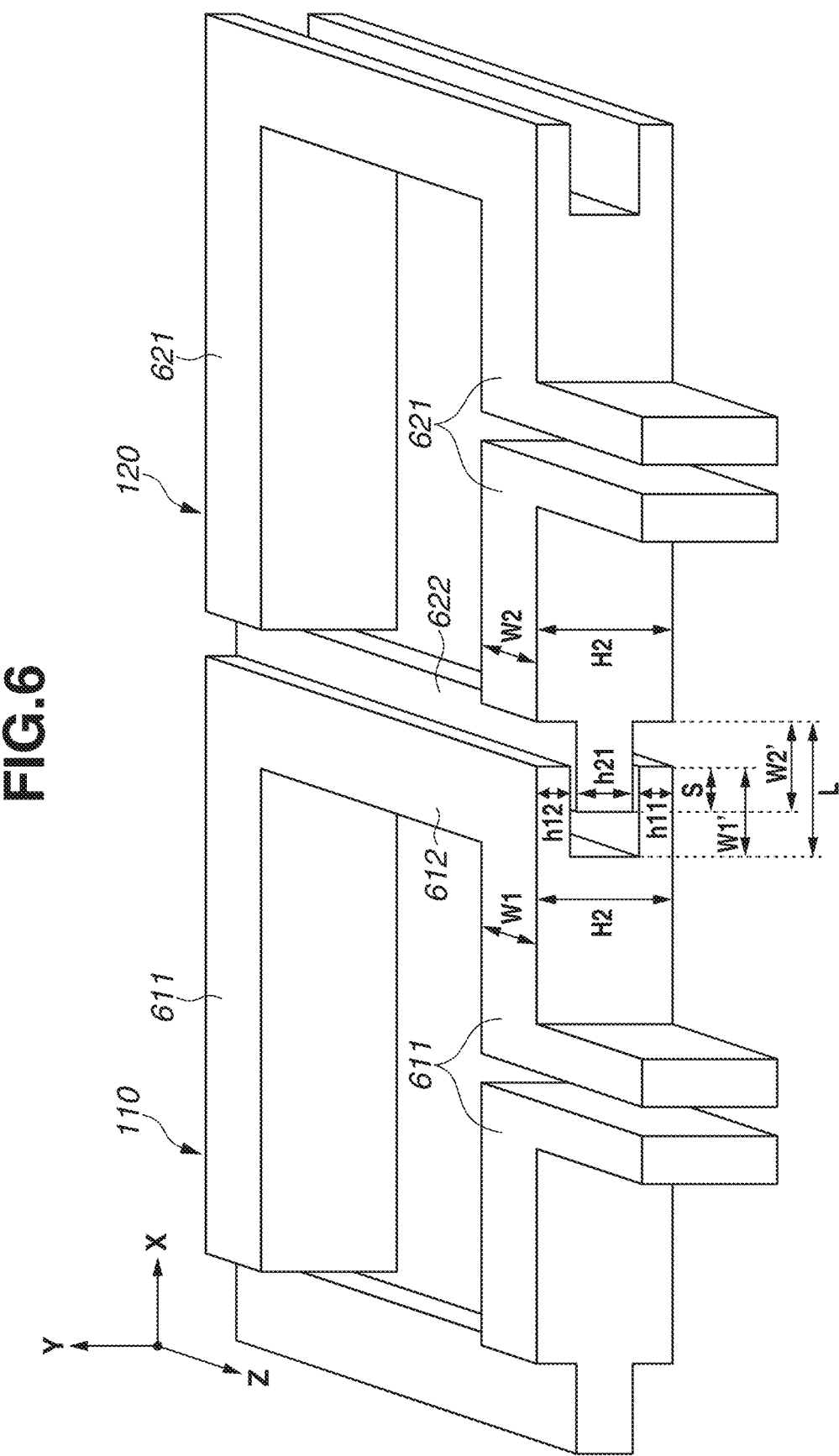
FIG. 6 is a diagram schematically illustrating a second example of a configuration including the first power transmission coil and the second power transmission coil that are the two adjacent power transmission coils illustrated in FIG. 1, according to the second exemplary embodiment of the present disclosure.

FIG. 6 is a diagram schematically illustrating a second example of the first power transmission coil 110 and the second power transmission coil 120 that are the two adjacent power transmission coils illustrated in FIG. 2, according to the second exemplary embodiment of the present disclosure. In FIG. 6, components similar to those illustrated in FIGS. 1 to 3, and 5 are assigned the same reference numerals or symbols, and the detailed descriptions thereof are omitted. In FIG. 6, an XYZ coordinate system corresponding to the XYZ coordinate system illustrated in FIG. 1 is illustrated.

As illustrated in FIG. 6, the first power transmission coil 110 has portions 611 with the first conductor width W1 in the conductor body arranged in the moving direction (X direction) of the transportation vehicle 200 illustrated in FIG. 1. In the first power transmission coil 110 illustrated in FIG. 6, it is desirable that the portions 611 with the first conductor width W1 of the conductor body arranged in the moving direction (X direction) of the transportation vehicle 200 illustrated in FIG. 1 occupy half or more of the entire conductor body (more desirably, 80% or more), in consideration of manufacturing errors or the like. Further, as illustrated in FIG. 6, the first power transmission coil 110 has a portion 612 with the second conductor width W1' in the conductor body arranged in the direction (Z direction) orthogonal to the moving direction (X direction) of the transportation vehicle 200 illustrated in FIG. 1. As illustrated in FIG. 6, the height H2 of the first power transmission coil 110 corresponds to the length in the direction intersecting with (more specifically, orthogonal to, in the present exemplary embodiment) the first conductor width W1 in the portions 611 with the first conductor width W1.

As illustrated in FIG. 6, the second power transmission coil 120 has portions 621 with the third conductor width W2 in the conductor body arranged in the moving direction (X direction) of the transportation vehicle 200 illustrated in FIG. 1. In the second power transmission coil 120 illustrated in FIG. 6, it is desirable that the portions 621 with the third conductor width W2 of the conductor body arranged in the moving direction (X direction) of the transportation vehicle 200 illustrated in FIG. 1 occupy half or more of the entire conductor body (more desirably, 80% or more), in consideration of manufacturing errors or the like. Further, as illustrated in FIG. 6, the second power transmission coil 120 has a portion 622 with the fourth conductor width W2' in the conductor body arranged in the direction (Z direction) orthogonal to the moving direction (X direction) of the transportation vehicle 200 illustrated in FIG. 1. As illustrated in FIG. 6, the height H2 of the second power transmission coil 120 corresponds to the length in the direction intersecting with (more specifically, orthogonal to, in the present exemplary embodiment) the third conductor width W2 in the portions 621 with the third conductor width W2.

FIG. 6 illustrates a state where the portion 612 with the second conductor width W1' in the first power transmission coil 110, and the portion 622 with the fourth conductor width W2' in the second power transmission coil 120 are adjacently arranged to have the predetermined overlapping section S. In this case, the predetermined overlapping section S is an overlapping section in the moving direction (X direction) of the transportation vehicle 200, which is the movable object provided with the power reception coil 210 illustrated in FIG. 1.

In this case, in the present exemplary embodiment, the predetermined overlapping section S has a size larger than zero.

In FIG. 6, in the adjacent area of the portion 612 with the second conductor width W1' in the first power transmission coil 110, and the portion 622 with the fourth conductor width W2' in the second power transmission coil 120, the distance L in the moving direction (X direction) of the transportation vehicle 200 including the respective conductor bodies becomes as follows. The distance L is a difference between the predetermined overlapping section S and the sum of the second conductor width W1' and the fourth conductor width W2', as illustrated in FIG. 6.

In FIG. 6, the adjacent portions of the first power transmission coil 110 and the second power transmission coil 120 have protrusions and recessions to form multiple steps thus providing the predetermined overlapping section S, so that the distance L is reduced. This prevents a decrease in the coupling coefficient between the power transmission coils and the power reception coils. More specifically, in FIG. 6, the difference (i.e., distance L) between the predetermined overlapping section S and the sum of the second conductor width W1' and the fourth conductor width W2' is made smaller than the sum of the first conductor width W1 and the third conductor width W2, thus preventing a decrease in the coupling coefficient between the power transmission coils and the power reception coils.

In the example illustrated in FIG. 6, a height h11 of a lower portion of the portion 612 with the second conductor width W1' in the first power transmission coil 110 corresponds to the length in the direction intersecting with (more specifically, orthogonal to, in the present exemplary embodiment) the second conductor width W1' at the lower portion. Similarly, in the example illustrated in FIG. 6, a height h12 of an upper portion of the portion 612 with the second conductor width W1' in the first power transmission coil 110 corresponds to the length in the direction intersecting with (more specifically, orthogonal to, in the present exemplary embodiment) the second conductor width W1' at the upper portion. In the example illustrated in FIG. 6, a height h21 of the portion 622 with the fourth conductor width W2' in the second power transmission coil 120 corresponds to the length in the direction intersecting with (more specifically, orthogonal to, in the present exemplary embodiment) the fourth conductor width W2'. In the example illustrated in FIG. 6, the sum of the height h11 and the height h12 of the portion 612 with the second conductor width W1', and the height h21 of the portion 622 with the fourth conductor width W2' is smaller than the height H2 of the portions 611 with the first conductor width W1 and the height H2 of the portions 621 with the third conductor width W2. Accordingly, in the example illustrated in FIG. 6, the first power transmission coil 110 and the second power transmission coil 120, which are two power transmission coils, are not in contact with each other.

Figure 7:
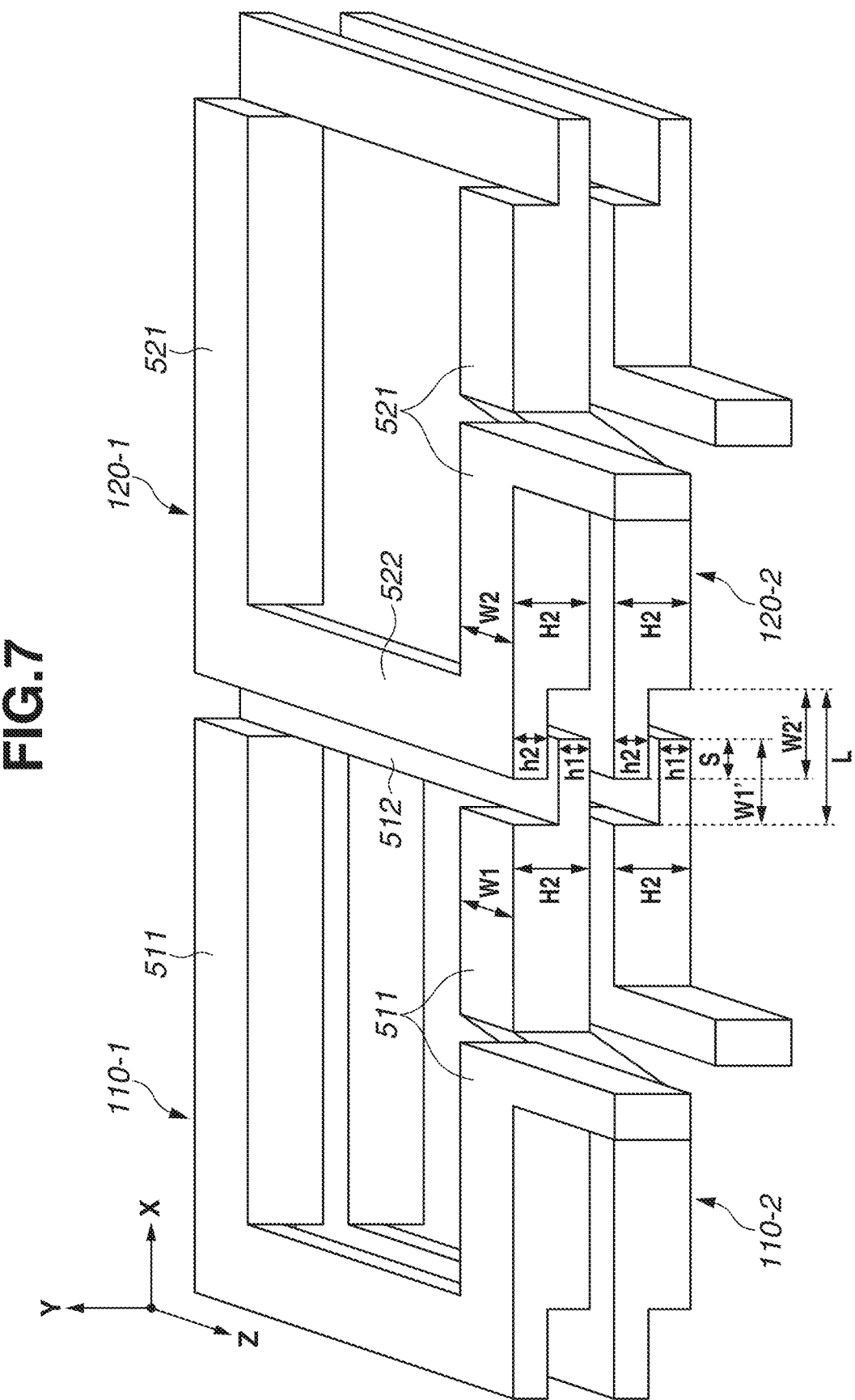
FIG. 7 is a diagram schematically illustrating a third example of a configuration including the first power transmission coil and the second power transmission coil that are the two adjacent power transmission coils illustrated in FIG. 1, according to the second exemplary embodiment of the present disclosure.

FIG. 7 is a diagram schematically illustrating a third example of a configuration including the first power transmission coil 110 and the second power transmission coil 120 that are the two adjacent power transmission coils illustrated in FIG. 1, according to the second exemplary embodiment of the present disclosure. In FIG. 7, components similar to those illustrated in FIGS. 1 to 3, 5, and 6 are assigned the same reference numerals or symbols, and the detailed descriptions thereof are omitted. In FIG. 7, an XYZ coordinate system corresponding to the XYZ coordinate system illustrated in FIGS. 1 and 5 is illustrated.

More specifically, the third example illustrated in FIG. 7 is an example in which the number of turns in each of the first power transmission coil 110 and the second power transmission coil 120 is increased as compared with the first example illustrated in FIG. 5. More specifically, the first example illustrated in FIG. 5 includes the first power transmission coil 110 with the number of turns in the coil being one, and the second power transmission coil 120 with the number of turns in the coil being one. In contrast to this, the third example illustrated in FIG. 7 includes first power transmission coils 110-1 and 110-2 with the number of turns in the coils being two, and second power transmission coils 120-1 and 120-2 with the number of turns in the coils being two. As described above, in the present exemplary embodiment, the number of turns in each of the first power transmission coil 110 and the second power transmission coil 120 is not limited to one, and may be two or more.

FIG. 8 is a characteristic graph illustrating a coupling coefficient between the power transmission coils and the power reception coils with respect to each position of the power reception coil 210, according to the second exemplary embodiment of the present disclosure. In FIG. 8, the horizontal axis indicates positions of the power reception coil 210, in which the left side positions facing the first power transmission coil 110 are defined as negative positions, and the right side positions facing the second power transmission coil 120 are defined as positive positions, with the center position of the predetermined indeterminate position S illustrated in FIG. 5 being 0 mm. In FIG. 8, the vertical axis indicates coupling coefficients between the power transmission coils and the power reception coils. More specifically, each coupling coefficient indicates the sum of a coupling coefficient between the first power transmission coil 110 and the power reception coil 210, and a coupling coefficient between the second power transmission coil 120 and the power reception coil 210.

A data line 1 illustrated by a dotted line in FIG. 8 illustrates characteristics of the configuration including the first power transmission coil 110 and the second power transmission coil 120 illustrated in FIG. 2. More specifically, the data line 1 in FIG. 8 indicates characteristics in a case where the predetermined overlapping section S is determined to be 0 mm, when the first conductor width W1, the second conductor width W1', the third conductor width W2, and the fourth conductor width W2' illustrated in FIG. 2 are determined to be 30 mm, and the separation distance D illustrated in FIG. 2 is determined to be 1 mm. A data line 2 illustrated by a solid line in FIG. 8 indicates characteristics of the configuration including the first power transmission coil 110 and the second power transmission coil 120 illustrated in FIG. 5. More specifically, the data line 2 in FIG. 8 indicates characteristics in a case where the predetermined overlapping section S in FIG. 5 is determined to be 29 mm, when the first conductor width W1, the second conductor width W1', the third conductor width W2, and the fourth conductor width W2' illustrated in FIG. 5 are determined to be 30 mm. From the characteristic graph illustrated in FIG. 8, it is found that the data line 1 indicates that the coupling coefficient between the power transmission coils and the power reception coils on the vertical axis decreases at a position at which the power reception coil 210 is located near 0 mm, relative to positions other than the position at which the power reception coil 210 is located near 0 mm on the horizontal axis, but the data line 2 indicates that the decrease is improved.

Table 2 below indicates rates of decrease each from a maximum value to a minimum value in the coupling coefficient between the power transmission coils and the power reception coils with respect to a position of the power reception coil 210.

TABLE 2

| Data Row Name | W1, W2 [mm] | W1', W2' [mm] | S [mm] | L [mm] | Rate of decrease from Maximum Value to Minimum Value [%] |
| --- | --- | --- | --- | --- | --- |
| 1. S = 0 mm | 30 | 30 | 0 | 61 | 7.2% |
| 2. S = 29 mm | 30 | 30 | 29 | 31 | 1.7% |
| 3. S = 15 mm | 30 | 30 | 15 | 45 | 4.4% |
| 4. S = 1 mm | 30 | 30 | 1 | 59 | 7.0% |

A data row 1 in table 2 corresponds to the data line 1 illustrated in FIG. 8. A data row 2 in table 2 corresponds to the data line 2 in FIG. 8. As illustrated in table 2, the calculated rate of decrease from the maximum value to the minimum value of the coupling coefficient between the power transmission coils and the power reception coils with respect to the position of the power reception coil 210 for the data line 1 illustrated in FIG. 8 is 7.2%. As illustrated in table 2, the calculated rate of decrease from the maximum value to the minimum value of the coupling coefficient between the power transmission coils and the power reception coils with respect to the position of the power reception coil 210 for the data line 2 illustrated in FIG. 8 is 1.7%. Further, a data row obtained by changing the condition in which the predetermined overlapping section S is 29 mm in the above-described data row 2 to a condition in which the predetermined overlapping section S is 15 mm is referred to as a data row 3, and a data row obtained by changing the condition to a condition in which the predetermined overlapping section S is 1 mm is referred to as a data row 4. As illustrated in table 2, the calculated rate of decrease from the maximum value to the minimum value of the coupling coefficient between the power transmission coils and the power reception coils with respect to the position of the power reception coil 210 for the data row 3 is 4.4%. As illustrated in table 2, the calculated rate of decrease from the maximum value to the minimum value of the coupling coefficient between the power transmission coils and the power reception coils with respect to the position of the power reception coil 210 for the data row 4 is 7.0%.

It is found from the results indicated in table 2 that the rate of decrease from the maximum value to the minimum value of the coupling coefficient between the power transmission coils and the power reception coils with respect to the position of the power reception coil 210 in each of the data rows 2, 3, and 4 is smaller than that in the data row 1, so that a decrease in the coupling coefficient between the power transmission coils and the power reception coils is prevented. More specifically, in the data row 2, which is applicable to the present exemplary embodiment, the difference (31 mm: distance L) between the predetermined overlapping section S and the sum of the second conductor width W1' and the fourth conductor width W2' is smaller than the sum (60 mm) of the first conductor width W1 and the third conductor width W2. In the data row 3, which is applicable to the present exemplary embodiment, the difference (45 mm: distance L) between the predetermined overlapping section S and the sum of the second conductor width W1' and the fourth conductor width W2' is smaller than the sum (60 mm) of the first conductor width W1 and the third conductor width W2. In the data row 4, which is applicable to the present exemplary embodiment, the difference (59 mm: distance L) between the predetermined overlapping section S and the sum of the second conductor width W1' and the fourth conductor width W2' is smaller than the sum (60 mm) of the first conductor width W1 and the third conductor width W2.

From the results indicated in table 2, it is found that a decrease in the coupling coefficient between the power transmission coils and the power reception coils can be improved with the size of the predetermined overlapping section S larger than zero (data rows 2 to 4), as compared with the case with the size of the predetermined overlapping section S being zero (data row 1). In the example illustrated in table 2, the characteristic results in the case where both the first conductor width W1 and the third conductor width W2 are 30 mm are described, but they are not limited to the conductor width. In the present exemplary embodiment, it is sufficient that the relationship that the difference between the predetermined overlapping section S and the sum of the second conductor width W1' and the fourth conductor width W2' is smaller than the sum of the first conductor width W1 and the third conductor width W2 is satisfied.

According to the second exemplary embodiment, portions of the conductor bodies of the two power transmission coils in adjacent portions have protrusions and recessions to form the predetermined overlapping section S, thus preventing a decrease in the coupling coefficient between the power transmission coils and the power reception coils when the power reception coil moves parallel to and in close proximity to the adjacent portions of the two power transmission coils. For example, according to the second exemplary embodiment, even in the case where the height H2 of the respective power transmission coils 110 and 120 is larger than the separation distance H1 between the power transmission coils and the power reception coils in the power feed direction (Y direction), it is possible to prevent a decrease in the coupling coefficient between the power transmission coils and the power reception coils.

The above-described exemplary embodiments are merely specific examples to implement the present disclosure, and should not be construed as limiting the technical range of the present invention. Thus, embodiments of the present disclosure can be realized in diverse ways as long as it is in accordance with the technological thought or main features of the present disclosure.

The exemplary embodiments of the present disclosure include the following configurations.

[Configuration 1]

A wireless power transmission apparatus including:
a first power transmission coil configured to transmit power to a power reception coil, and including a portion with a first conductor width and a portion with a second conductor width; and
a second power transmission coil configured to transmit power to the power reception coil, and including a portion with a third conductor width and a portion with a fourth conductor width,
wherein the first power transmission coil and the second power transmission coil are adjacent to each other at the portion with the second conductor width and the portion with the fourth conductor width with a predetermined separation distance,
wherein a sum of the second conductor width and the fourth conductor width is smaller than a sum of the first conductor width and the third conductor width, and
wherein the predetermined separation distance is smaller than or equal to a smaller one of the second conductor width and the fourth conductor width.

[Configuration 2]

The wireless power transmission apparatus according to configuration 1, wherein the predetermined separation distance is a separation distance in a moving direction of a movable object including the power reception coil.

[Configuration 3]

The wireless power transmission apparatus according to configuration 1 or 2, wherein the predetermined separation distance is an average distance between the portion with the second conductor width and the portion with the fourth conductor width.

[Configuration 4]

A wireless power transmission apparatus comprising:
a first power transmission coil configured to transmit power to a power reception coil, and including a portion with a first conductor width and a portion with a second conductor width; and
a second power transmission coil configured to transmit power to the power reception coil, and including a portion with a third conductor width and a portion with a fourth conductor width,
wherein the first power transmission coil and the second power transmission coil are adjacent to each other at the portion with the second conductor width and the portion with the fourth conductor width to have a predetermined overlapped section, and
wherein a difference between the predetermined overlapping section and a sum of the second conductor width and the fourth conductor width is smaller than a sum of the first conductor width and the third conductor width.

[Configuration 5]

The wireless power transmission apparatus according to configuration 4, wherein the predetermined overlapping section is an overlapping section in a moving direction of a movable object including the power reception coil.

[Configuration 6]

The wireless power transmission apparatus according to configuration 4 or 5, wherein the predetermined overlapping section is larger than zero in size.

[Configuration 7]

The wireless power transmission apparatus according to any one of configurations 4 to 6, wherein a sum of a height of the portion with the second conductor width in a direction intersecting with the second conductor width, and a height of the portion with the fourth conductor width in a direction interesting with the fourth conductor width is smaller than a height of the portion with the first conductor width in a direction intersecting with the first conductor width, and a height of the portion with the third conductor width in a direction intersecting with the third conductor width.

[Configuration 8]

The wireless power transmission apparatus according to any one of configurations 1 to 7, wherein a number of turns in each of the first power transmission coil and the second power transmission coil is one or more.

[Configuration 9]

The wireless power transmission apparatus according to any one of configurations 1 to 8, wherein a current flowing through the first power transmission coil and a current flowing through the second power transmission coil have a same phase.

[Configuration 10]

The wireless power transmission apparatus according any one of configurations 1 to 9,
wherein the portion with the first conductor width occupies more than or equal to half of a conductor body disposed in a moving direction of a movable object including the power reception coil in the first power transmission coil, and
wherein the portion with the third conductor width occupies more than or equal to half of a conductor body disposed in the moving direction of the movable object in the second power transmission coil.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-140231, filed Aug. 30, 2023, which is hereby incorporated by reference herein in its entirety.

What is claimed is:

1. A wireless power transmission apparatus comprising:
a first power transmission coil configured to transmit power to a power reception coil, and including a portion with a first conductor width and a portion with a second conductor width; and
a second power transmission coil configured to transmit power to the power reception coil, and including a portion with a third conductor width and a portion with a fourth conductor width,
wherein the first power transmission coil and the second power transmission coil are adjacent to each other at the portion with the second conductor width and the portion with the fourth conductor width with a predetermined separation distance,
wherein a sum of the second conductor width and the fourth conductor width is smaller than a sum of the first conductor width and the third conductor width, and wherein the predetermined separation distance is smaller than or equal to a smaller one of the second conductor width and the fourth conductor width.

2. The wireless power transmission apparatus according to claim 1, wherein the predetermined separation distance is a separation distance in a moving direction of a movable object including the power reception coil.

3. The wireless power transmission apparatus according to claim 1, wherein the predetermined separation distance is an average distance between the portion with the second conductor width and the portion with the fourth conductor width.

4. A wireless power transmission apparatus comprising:
   a first power transmission coil configured to transmit power to a power reception coil, and including a portion with a first conductor width and a portion with a second conductor width; and
   a second power transmission coil configured to transmit power to the power reception coil, and including a portion with a third conductor width and a portion with a fourth conductor width,
   wherein the first power transmission coil and the second power transmission coil are adjacent to each other at the portion with the second conductor width and the portion with the fourth conductor width to have a predetermined overlapped section, and
   wherein a difference between the predetermined overlapping section and a sum of the second conductor width and the fourth conductor width is smaller than a sum of the first conductor width and the third conductor width.

5. The wireless power transmission apparatus according to claim 4, wherein the predetermined overlapping section is an overlapping section in a moving direction of a movable object including the power reception coil.

6. The wireless power transmission apparatus according to claim 4, wherein the predetermined overlapping section is larger than zero in size.

7. The wireless power transmission apparatus according to claim 4, wherein a sum of a height of the portion with the second conductor width in a direction intersecting with the second conductor width, and a height of the portion with the fourth conductor width in a direction interesting with the fourth conductor width is smaller than a height of the portion with the first conductor width in a direction intersecting with the first conductor width, and a height of the portion with the third conductor width in a direction intersecting with the third conductor width.

8. The wireless power transmission apparatus according to claim 1, wherein a number of turns in each of the first power transmission coil and the second power transmission coil is one or more.

9. The wireless power transmission apparatus according to claim 1, wherein a current flowing through the first power transmission coil and a current flowing through the second power transmission coil have a same phase.

10. The wireless power transmission apparatus according to claim 1,
    wherein the portion with the first conductor width occupies more than or equal to half of a conductor body disposed in a moving direction of a movable object including the power reception coil in the first power transmission coil, and
    wherein the portion with the third conductor width occupies more than or equal to half of a conductor body disposed in the moving direction of the movable object in the second power transmission coil.

11. A wireless power transmission apparatus comprising:
    a first power transmission coil configured to transmit power to a power reception coil, and including a portion with a first height and a portion with a second height; and
    a second power transmission coil configured to transmit power to the power reception coil, and including a portion with a third height and a portion with a fourth height,
    wherein the first power transmission coil and the second power transmission coil are disposed in such a manner that the portion with the second height and the portion with the fourth height are overlapped, and
    wherein a sum of the second height and the fourth height is smaller than the first height and the third height.

12. The wireless power transmission apparatus according to claim 11, wherein a number of turns in each of the first power transmission coil and the second power transmission coil is one or more.

13. The wireless power transmission apparatus according to claim 11, wherein a current flowing through the first power transmission coil and a current flowing through the second power transmission coil have a same phase.

* * * * *